Figure 1:
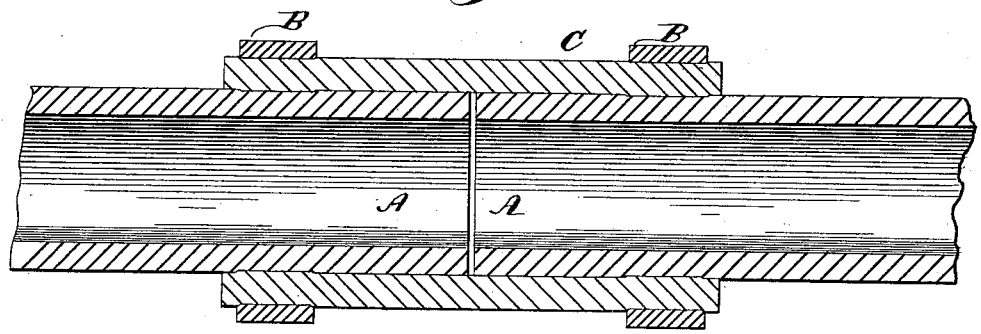

(No Model.)

J. HEMPHILL.
METHOD OF AND MEANS FOR COUPLING PIPES.

No. 351,263. Patented Oct. 19, 1886.

Witnesses:
J. B. McGirr.
John G. Moore.

Inventor:
James Hemphill
by Connolly Bros
atty.

UNITED STATES PATENT OFFICE.

JAMES HEMPHILL, OF PITTSBURG, PENNSYLVANIA.

METHOD OF AND MEANS FOR COUPLING PIPES.

SPECIFICATION forming part of Letters Patent No. 351,263, dated October 19, 1886.

Application filed February 16, 1886. Serial No. 192,111. (No model.)

*To all whom it may concern:*

Be it known that I, JAMES HEMPHILL, a citizen of the United States, residing at Pittsburg, in the county of Allegheny and State of Pennsylvania, have invented certain new and useful Improvements in Methods and Means for Coupling Pipes for the Conveyance of Fluids Under Pressure; and I do hereby declare the following to be a full, clear, and exact description of the invention, reference being had to the accompanying drawings, which form part of this specification.

This invention has relation to the couplings or joint-connections of conduits, mains, or pipes employed for the conveyance of fluids under pressure, and particularly for the conveyance of natural gas.

The object of this invention is to provide a novel method and means for securing and rendering fluid-tight the collars, sleeves, sockets, or other devices which are applied to the ends of the conduit-sections to couple sections together.

In coupling sections of tubing together for the purpose of adapting such tubing for the conveyance of fluids under pressure it has been customary to employ a coupling sleeve or joint, and such sleeve or joint has been applied in various ways, as by the use of rivets, bolts, or connecting-lugs, or by correspondingly screw-threading the ends of the tube-sections and the interior of the coupling sleeve or socket; but it has not hitherto been found feasible or practicable to so connect the coupling sleeve or "joint" to the sections so as to render the same fluid-tight where it has been necessary to withstand very great internal pressure, as in the conveyance of natural gas, without the employment of calking or other expedients of a similar character, all of which are expensive, difficult to apply, and unreliable. Where expanding joints are employed, it has heretofore been found more difficult to produce a secure and fluid-tight joint, inasmuch as the usual construction of expanding couplings preclude the effective application and use of calking or packing.

My invention is intended, primarily, to provide for the connection to the pipe-sections in a perfectly secure and fluid-tight manner, the coupling expedients constituting an expanding joint, and accordingly contemplates the provision of means for producing a perfectly tight and reliable joint without employing calking, filling, or any of the ordinary means used for rendering the joint fluid-tight.

My invention accordingly consists, broadly, in the employment, as a means for securing coupling sleeves, collars, or joints to the sections of conduits or pipes, of bands, rings, or collars of cast or wrought iron or other suitable metal applied to the exterior of said sleeves or coupling collars or joints while said rings or bands are heated and expanded, and then allowed to cool, and thereby shrink the coupling sleeves, collars, or joints upon the sections.

It is well known that if a band or ring of metal be heated to expansion and then applied to a hub or core piece it will upon cooling contract and exert an enormous pressure, sometimes sufficient to embed the contracting-ring into the metal which it embraces, almost welding itself thereto. When a heated ring of metal is applied to a metallic tube—such as a coupling-sleeve—the contractile force is sufficient to diminish the diameter of such tube, even where the walls of the latter are very thick; hence when such a sleeve is applied to an iron or steel tube of the kind employed for the conveyance of fluids under pressure, and then subjected to the action or impact of the contracting-ring, the sleeve will be caused to bind upon the tube with extraordinary force, and will even seat or embed itself in the surface thereof.

In an application filed by me the 28th day of December, 1885, Serial No. 186,907, I have shown and described a construction of expansible joint, to which I deem my present improvement a suitable adjunct, while I do not limit myself to any special application of such improvement, as it may be used to great advantage wherever a coupling-sleeve is employed.

In the accompanying drawings I have shown my present improvement as applied to an ordinary coupling-sleeve and as applied to the form of joint constituting the subject of my application already referred to.

Figure 2:
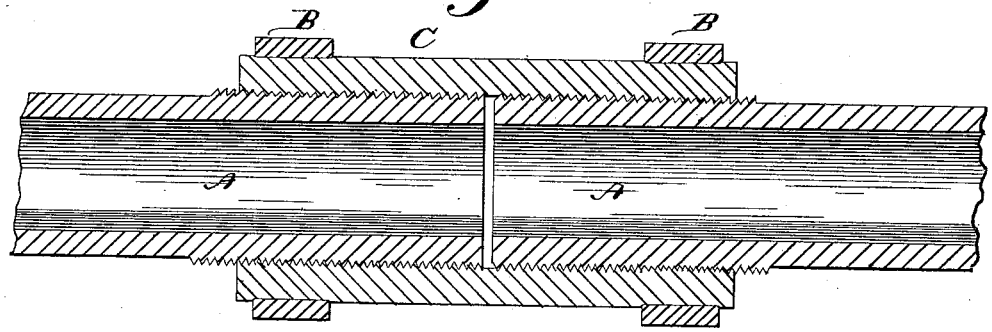

Figure 1 is a central longitudinal section of an ordinary tubular coupling-sleeve with portions of two connected pipe-sections fitted thereto. Fig. 2 is a similar section of a modification, and Fig. 3 is a similar section of my improved expanding-joint with the contracted ring in place.

In carrying my invention into effect I employ either cast or wrought iron or steel as the material for the rings; but I prefer wrought-iron as being the more economical, while being sufficiently effective for the purposes of my invention. The tubes or conduit-sections may be of either wrought or cast iron or steel, as may be the coupling-sleeves or other devices constituting the medium for the reception of the ends of the tubes.

In the drawings, A A designate the conduit-sections; B B, the rings, which are applied to the exterior of the coupling sleeve or joint, and C the coupling-sleeve.

Figure 3:
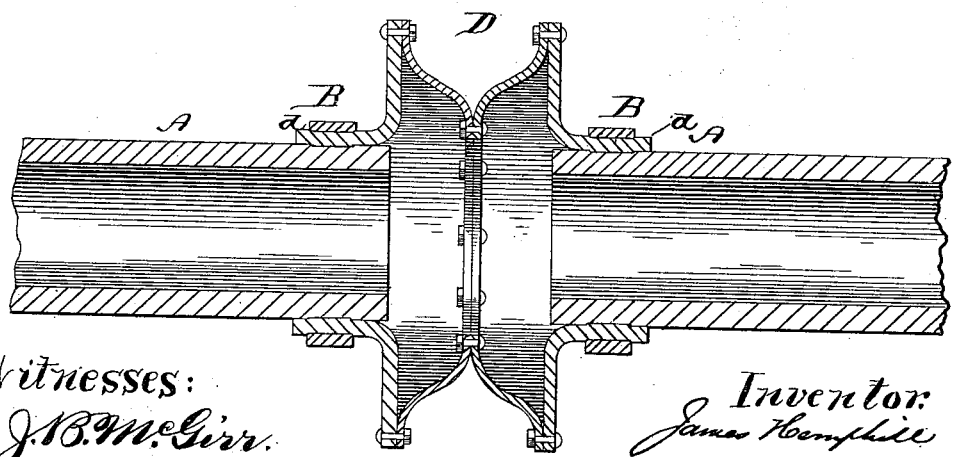

D in Fig. 3 designates my improved expanding joint, which is specifically described in my pending application and need be only incidentally referred to.

In laying pipes in the ground and applying the heated rings it will be necessary to employ a portable forge, or at least such an apparatus will be found most convenient, in order that the rings may be heated to a red heat in the neighborhood of the sections to be coupled.

In applying the ring to the sleeve, it is first passed over the end of the tube and the tube then slipped or screwed into the sleeve, after which the ring is slipped over the end of the sleeve and then allowed to cool. It will upon cooling contract sufficiently to not only bind the collar, but will contract the sleeve upon the pipe, and not only secure the same rigidly in place, but produce an absolutely close and fluid-tight joint, requiring no packing or other treatment to render it perfectly serviceable and durable.

It is to be understood of course that the diameter of the ring internally before heating is somewhat less than the external diameter of the sleeve or of that portion of the sleeve to which the ring is to be applied, in order that when the ring contracts it will bind the sleeve with the requisite pressure and contract it upon the tube. It is also to be understood that the diameter of the sleeve internally is of such relation to the external diameter of the tube that the contraction of the sleeve will cause it to impinge closely against the pipe or tube.

When the ring is applied to the expansible joint D, it is slipped over the flanges $d\,d$, being first placed upon the tube while heated and expanded.

The rings can be applied very readily and with great facility, thus saving a great amount of labor now expended in screwing tubes into sockets and in connecting the pipe-sections by the means now employed. I therefore deem my present improvement a more economical as well as more effective means for connecting pipes or tubes than any that has hitherto been produced.

While I have given sufficient description of my method for coupling pipes to enable others to carry the invention into effect, it is obvious that certain details as to size and relative proportion of parts must be left to the judgment of the practical mechanic. From experiments already made by me I find that where pipes of wrought-iron of ten inches internal diameter and one-quarter inch thickness have been coupled by means of a sleeve of ten inches internal diameter and a band two inches square shrunk thereon the pipes under compression of the band were reduced three thirty-seconds of an inch. In experimenting with a cast-iron hub three inches in thickness and bored out to fit easily over a shaft ten inches in diameter, a band two inches square when shrunk thereon caused such a contraction of the central orifice that the shaft could not be forced into the hub under extraordinary pressure. It follows, therefore, that whether the pipes and coupling parts be of wrought or cast iron the shrinking upon the coupling-sleeve of a band will cause the sleeve to contract upon and bind the pipes, and therefore fulfill the conditions of my invention, as set forth.

Having now described my invention, what I claim, and desire to secure by Letters Patent, is—

1. The method of securing coupling-sleeves, collars, sockets, or connecting-joints to the ends of conduits or tubes, which consists in shrinking upon said coupling-sleeves or other devices metallic rings, and thereby contracting the couplings upon the conduits or tubes, substantially as described.

2. The method of securing couplings to tubes, which consists in shrinking bands or rings of metal upon the exterior of said couplings after the insertion of the tubes or conduits.

3. The combination, with a section or sections of tubing, of a coupling consisting of a sleeve or other device and an external ring or rings of metal shrunk thereon, substantially as described.

In testimony that I claim the foregoing I have hereunto set my hand this 13th day of February, 1886.

JAMES HEMPHILL.

Witnesses:
WM. F. DUTTON,
A. A. CONNOLLY.